United States Patent
Sugimoto

(10) Patent No.: US 12,555,395 B2
(45) Date of Patent: Feb. 17, 2026

(54) IMAGE OUTPUT APPARATUS, METHOD FOR CONTROLLING IMAGE OUTPUT APPARATUS, AND STORAGE MEDIUM

(71) Applicant: CANON KABUSHIKI KAISHA, Tokyo (JP)

(72) Inventor: Shun Sugimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 17/935,850

(22) Filed: Sep. 27, 2022

(65) Prior Publication Data
US 2023/0112366 A1  Apr. 13, 2023

(30) Foreign Application Priority Data
Sep. 29, 2021 (JP) .................. 2021-159721

(51) Int. Cl.
G06V 20/70 (2022.01)

(52) U.S. Cl.
CPC .................. *G06V 20/70* (2022.01)

(58) Field of Classification Search
CPC ........ G06V 20/70; G06V 20/46; G06T 11/00; G06T 15/503; G06T 19/00; G06T 2219/004; H04N 21/23412; H04N 21/4316; H04N 21/8405
USPC ................. 382/180, 154, 103, 286
See application file for complete search history.

(56) References Cited

U.S. PATENT DOCUMENTS

| | | | | |
|---|---|---|---|---|
| 8,233,739 B1 * | 7/2012 | Cho | ......... | G06T 11/60 382/284 |
| 10,346,996 B2 * | 7/2019 | Shen | .......... | G06V 10/7788 |
| 11,423,615 B1 * | 8/2022 | Villalon | .......... | G06T 7/70 |
| 11,443,445 B2 * | 9/2022 | Gan | .......... | G06N 3/08 |
| 11,631,234 B2 * | 4/2023 | Cohen | .......... | G06F 16/535 382/103 |
| 11,727,576 B2 * | 8/2023 | Bisain | .......... | G06T 7/246 382/103 |
| 11,776,129 B2 * | 10/2023 | Mequanint | .......... | G06T 7/90 382/173 |
| 2013/0216206 A1 * | 8/2013 | Dubin | .......... | G11B 27/031 386/282 |
| 2015/0117777 A1 * | 4/2015 | Hsun | .......... | G06T 7/50 382/173 |
| 2015/0296198 A1 * | 10/2015 | Park | .......... | H04N 19/597 382/233 |
| 2016/0227121 A1 * | 8/2016 | Matsushita | .......... | G01B 11/22 |

(Continued)

FOREIGN PATENT DOCUMENTS

JP  2013061743 A  4/2013

*Primary Examiner* — Kathleen Y Dulaney

(74) *Attorney, Agent, or Firm* — Canon U.S.A., Inc. IP Division

(57) ABSTRACT

An image output apparatus comprising an output control unit configured to output region annotation information including region information indicating a region included in an image and annotation information indicating information on the region, the region annotation information being superimposed on the image, wherein when a plurality of pieces of the region annotation information are superimposed on the image, the output control unit superimposes first region annotation information associated with a first region with a first depth closer to the front than second region annotation information associated with a second region with a second depth that has larger depth than the first depth.

20 Claims, 13 Drawing Sheets

(56) References Cited

U.S. PATENT DOCUMENTS

| | | | | |
|---|---|---|---|---|
| 2016/0373722 | A1* | 12/2016 | Mishra | H04N 1/32309 |
| 2017/0053412 | A1* | 2/2017 | Shen | G06V 10/7788 |
| 2019/0160377 | A1* | 5/2019 | Masuda | A63F 13/655 |
| 2019/0362157 | A1* | 11/2019 | Cambias | G06V 10/255 |
| 2020/0160699 | A1* | 5/2020 | Annapureddy | B60W 40/04 |
| 2021/0073943 | A1* | 3/2021 | Park | G06T 3/4038 |
| 2021/0313045 | A1* | 10/2021 | Wu | G06N 3/09 |
| 2021/0319579 | A1* | 10/2021 | Ye | G06V 20/49 |
| 2021/0377566 | A1* | 12/2021 | Iguchi | H04N 19/70 |
| 2022/0138950 | A1* | 5/2022 | Gupta | G06T 7/11 |
| | | | | 382/173 |
| 2023/0020725 | A1* | 1/2023 | Ishii | G06T 7/70 |
| 2023/0092248 | A1* | 3/2023 | Xiong | G06V 10/759 |
| | | | | 382/103 |
| 2023/0154185 | A1* | 5/2023 | Kuen | G06V 10/751 |
| | | | | 382/100 |
| 2023/0267719 | A1* | 8/2023 | Parchami | G06V 10/765 |
| | | | | 382/156 |

* cited by examiner

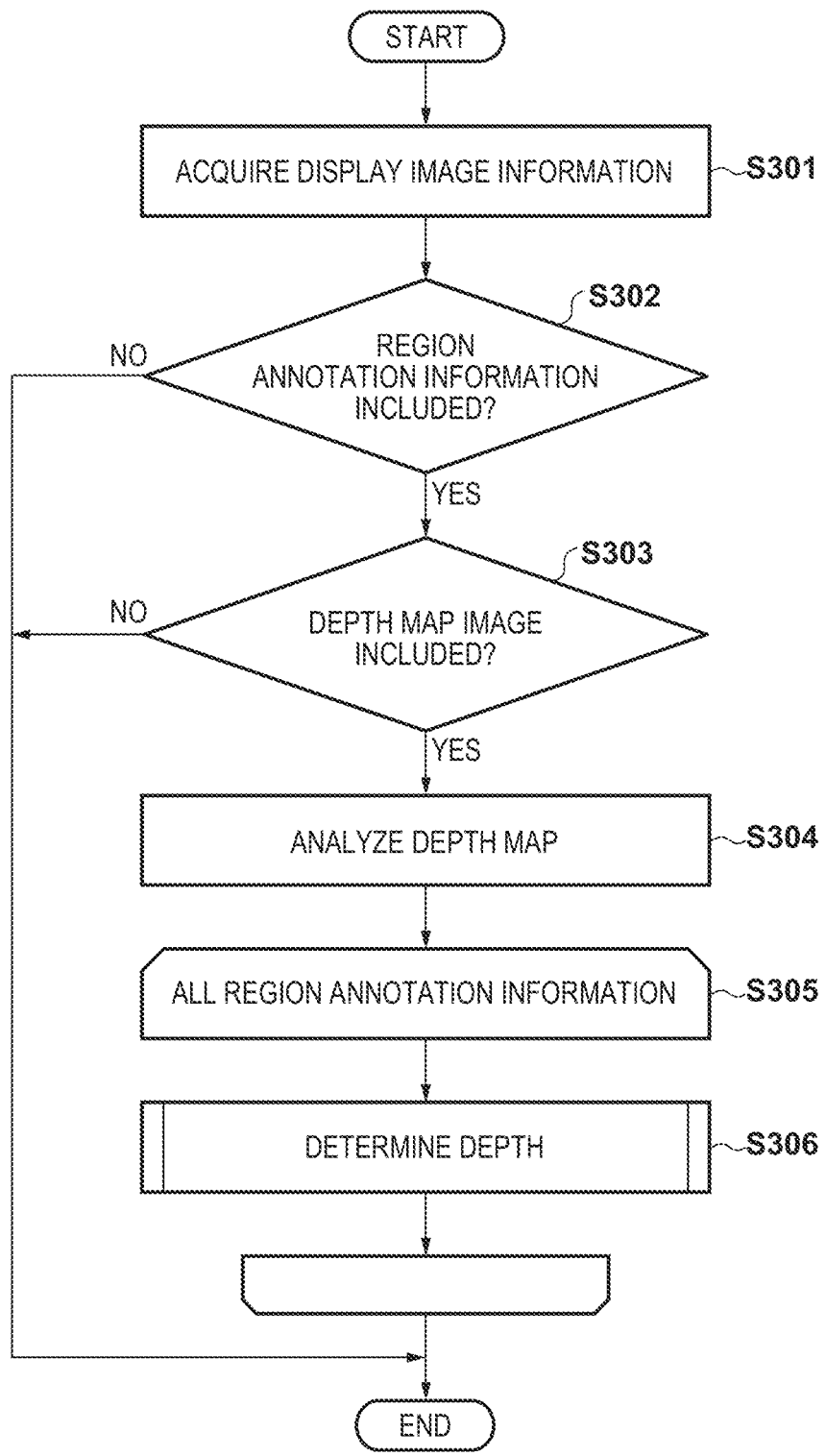

F I G. 4B

ItemReferenceBox 'iref':
  referenceType='auxl', from item_ID=2, ref_count=1, to item_ID='1';
  referenceType='cdsc', from item_ID=3, ref_count=1, to item_ID='1';
  referenceType='cdsc', from item_ID=4, ref_count=1, to item_ID='1';
  referenceType='cdsc', from item_ID=5, ref_count=1, to item_ID='1';
  referenceType='cdsc', from item_ID=6, ref_count=1, to item_ID='1';
  referenceType='cdsc', from item_ID=7, ref_count=1, to item_ID='1';
  referenceType='cdsc', from item_ID=8, ref_count=1, to item_ID='1';
  referenceType='cdsc', from item_ID=9, ref_count=1, to item_ID='1';

ItemProperBox 'iprp':
  ItemPropertyContainerBox'ipco':
    1) 'hvcC';
    2) 'ispe', width=1920, height=1080
    3) 'udes'; lang:EN, name: Man
    4) 'udes'; lang:EN, name: Tree
    5) 'udes'; lang:EN, name: Building
    6) 'udes'; lang:EN, name: Car
  ItemPropertyAssociation 'ipma': entry_count=9
    1) item_ID=1, association_count=2
        essential=1, property_index=1;
        essential=0, property_index=2;
    2) item_ID=2, association_count=2
        essential=1, property_index=1;
        essential=0, property_index=2;
    3) item_ID=3, association_count=2
        essential=0, property_index=4;
    4) item_ID=4, association_count=1
        essential=0, property_index=3;

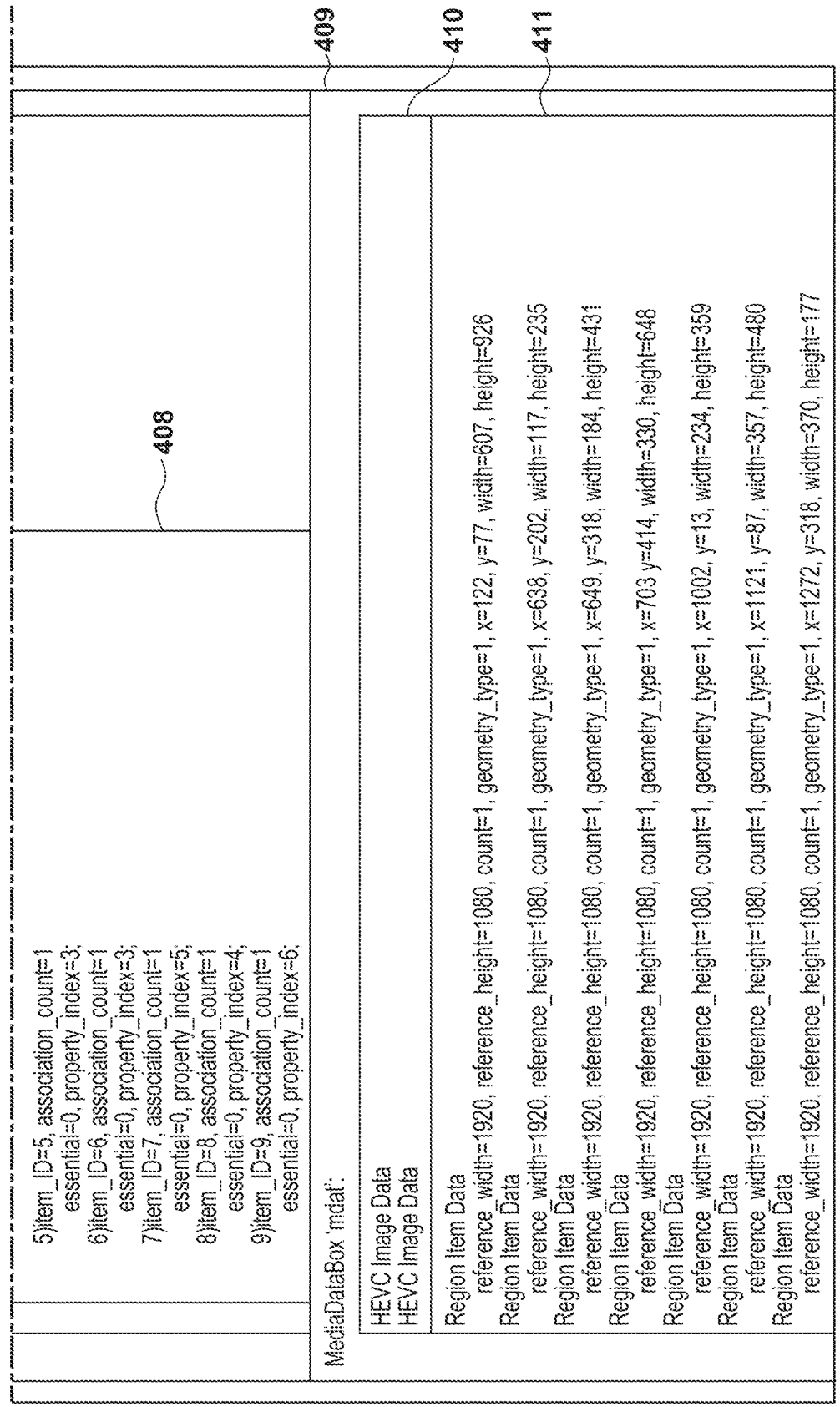

```
5) item_ID=5, association_count=1
   essential=0, property_index=3;
6) item_ID=6, association_count=1
   essential=0, property_index=3;
7) item_ID=7, association_count=1
   essential=0, property_index=5;
8) item_ID=8, association_count=1
   essential=0, property_index=4;
9) item_ID=9, association_count=1
   essential=0, property_index=6;

MediaDataBox 'mdat':
  HEVC Image Data
  HEVC Image Data
  Region Item Data
    reference_width=1920, reference_height=1080, count=1, geometry_type=1, x=122, y=77, width=607, height=926
  Region Item Data
    reference_width=1920, reference_height=1080, count=1, geometry_type=1, x=638, y=202, width=117, height=235
  Region Item Data
    reference_width=1920, reference_height=1080, count=1, geometry_type=1, x=649, y=318, width=184, height=431;
  Region Item Data
    reference_width=1920, reference_height=1080, count=1, geometry_type=1, x=703, y=414, width=330, height=648
  Region Item Data
    reference_width=1920, reference_height=1080, count=1, geometry_type=1, x=1002, y=13, width=234, height=359
  Region Item Data
    reference_width=1920, reference_height=1080, count=1, geometry_type=1, x=1121, y=87, width=357, height=480
  Region Item Data
    reference_width=1920, reference_height=1080, count=1, geometry_type=1, x=1272, y=318, width=370, height=177
```

408, 409, 410, 411

FIG. 5
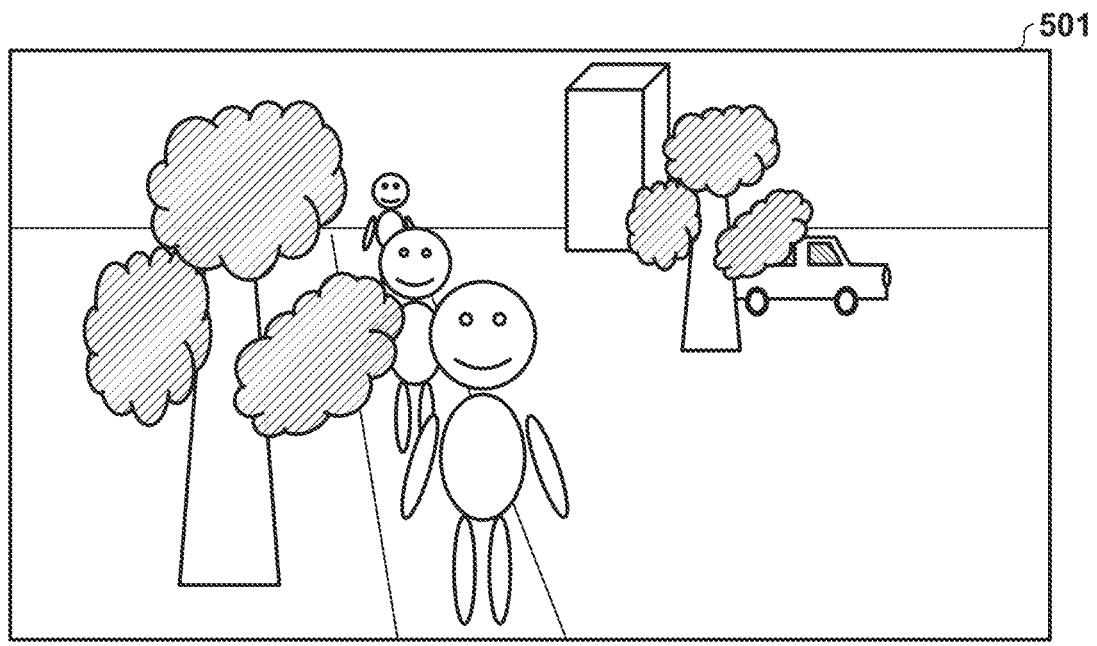
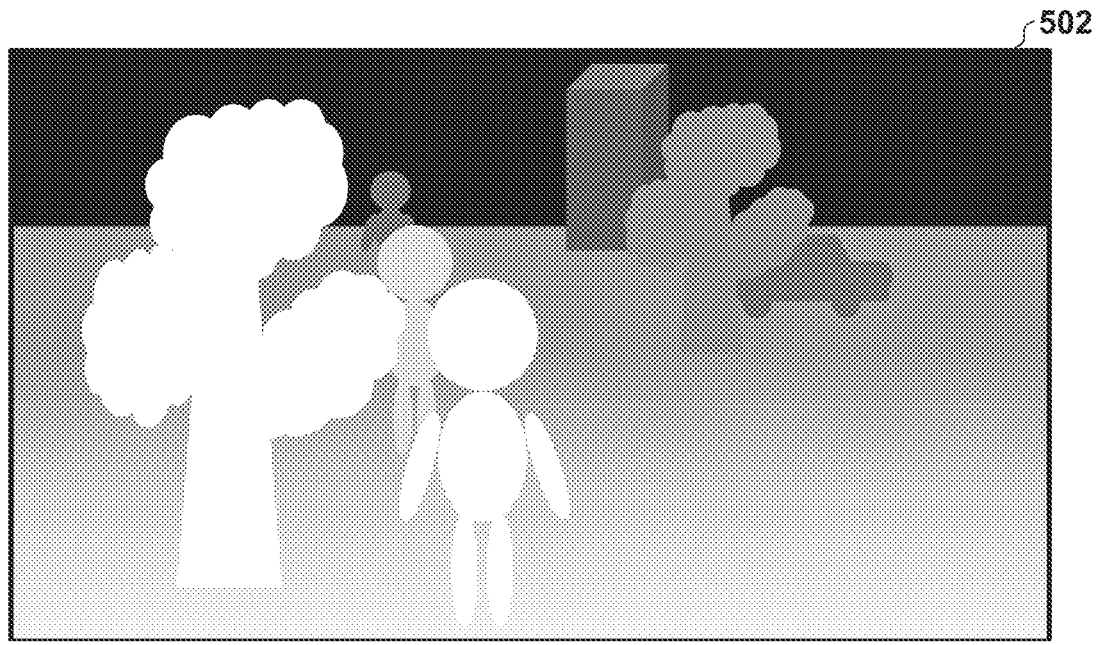

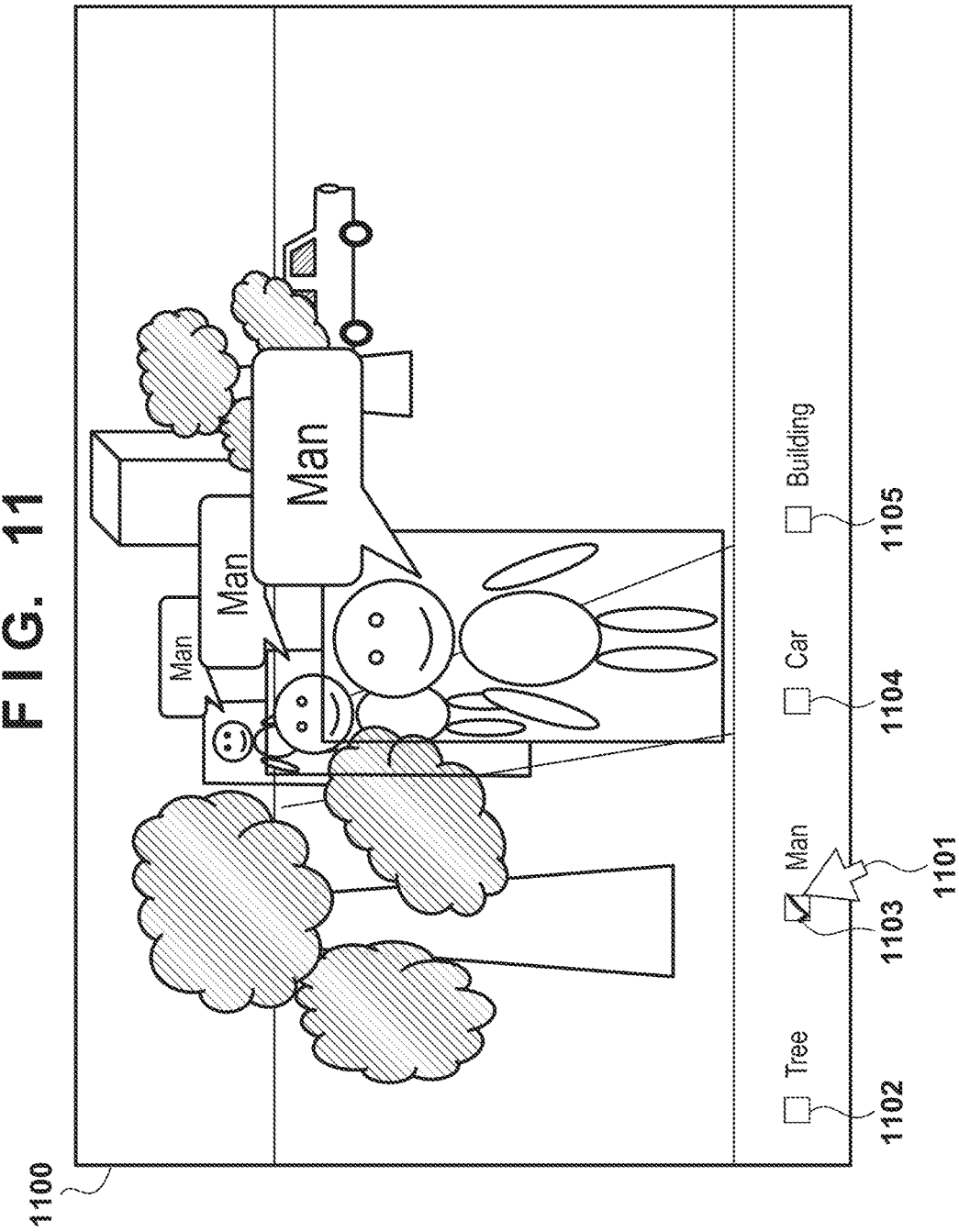

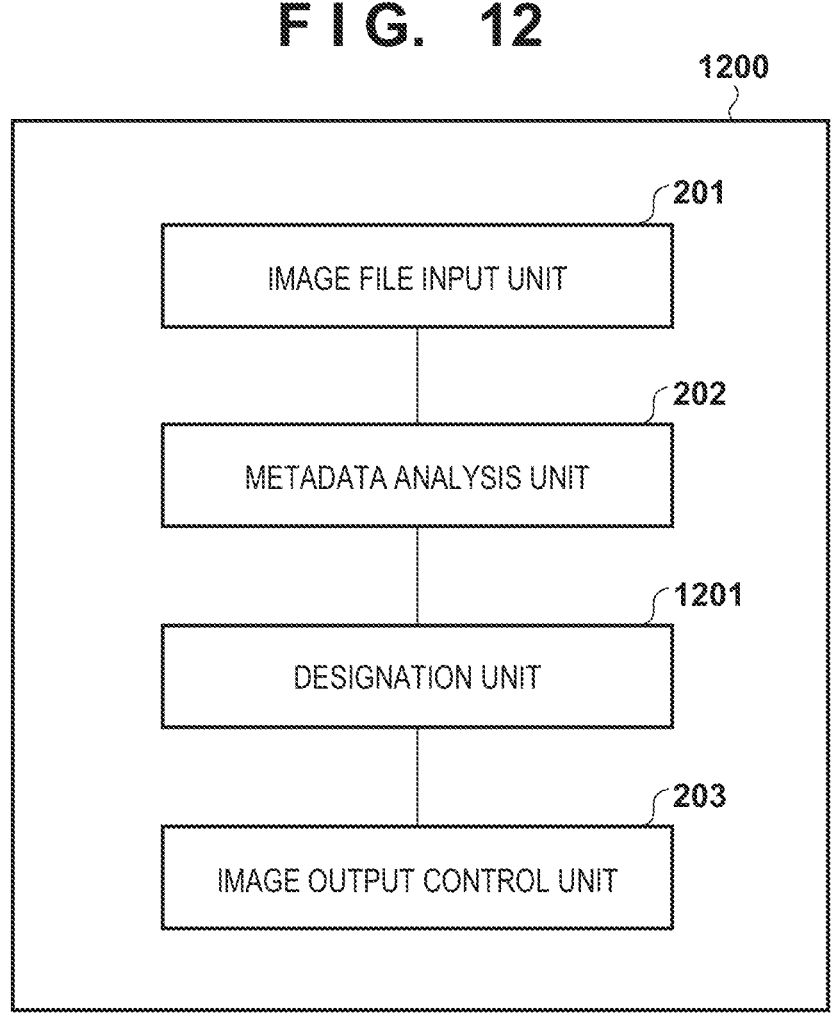

IMAGE OUTPUT APPARATUS, METHOD FOR CONTROLLING IMAGE OUTPUT APPARATUS, AND STORAGE MEDIUM

BACKGROUND OF THE DISCLOSURE

Field of the Disclosure

The present disclosure relates to an image output apparatus, a method for controlling the image output apparatus, and a storage medium, and particularly relates to a technique for outputting an image of an image file in which one or more pieces of image data is stored.

Description of the Related Art

Moving Pictures Experts Group (MPEG) has been working on standardization regarding storing of a single still image, a plurality of still images, or an image sequence (such as still image burst) in a single file. This standard is called High Efficiency Image File Format (HEIF) and enables images and image sequences to be exchanged, edited, and displayed.

HEIF includes a structure for storing not only a display image but also a non-display image that is auxiliary used in displaying the display image. For example, when a display image and a non-display image are each stored as an image item and item IDs of the non-display image and the display image are set with ItemReference set to Type='auxl', the images can be associated with each other. The non-display image auxiliary used for outputting the display image includes a depth map image. The depth map is information expressing the depth of a three-dimensional space. The depth map image is generally an image expressing a distance from a camera to an object by the shade of grayscale. By using the depth map image, it is possible to generate a three-dimensional image, a refocus image, and the like. Japanese Patent Laid-Open No. 2013-61743 describes a method of generating a refocus image.

Currently, extension of the HEIF standard has been under study in MPEG. Specifically, standardization for Region item as a metadata structure designating a region in an image has been under consideration. Region item is a structure to be stored in an HEIF file as a metadata item designating a region in the image, and to be associated with the image to enable a certain region in the image to be indicated. Furthermore, this Region item is configured to be annotatable. As methods for making annotation, a method of storing the annotation as an item property associated with Region item, a method of associating another image with Region item, and a method of associating metadata defined outside the HEIF have been under study. As an item property, by using a user description property identified with udes, any tag information, name, and description information can be associated with a region in the image. Region item annotated is hereinafter referred to as region annotation information.

Examples of a possible method of superimposing, on a single display image, a plurality of pieces of region annotation information associated to the single display image and outputting the resultant image include a method of superimposing the pieces of region annotation information in order of storage in the image file; and a method of superimposing the pieces of region annotation information in order of horizontal axis coordinates or vertical axis coordinates.

Unfortunately, in a case where a large amount of region annotation information is associated with a single display image, or in a case where each region of the region annotation information overlap, it may be difficult to intuitively recognize the association between the object indicated by the region and the annotation information when all the pieces of region annotation information are uniformly superimposed.

There is a need in the art for a technique enabling intuitive recognition of association between a region in an image and annotation information corresponding to the region.

SUMMARY OF THE DISCLOSURE

According one aspect of the present disclosure, there is provided an image output apparatus comprising an output control unit configured to output region annotation information including region information indicating a region included in an image and annotation information indicating information on the region, the region annotation information being superimposed on the image, wherein when a plurality of pieces of the region annotation information are superimposed on the image, the output control unit superimposes first region annotation information associated with a first region with a first depth closer to the front than second region annotation information associated with a second region with a second depth that has larger depth than the first depth.

Further features of the present disclosure will become apparent from the following description of exemplary embodiments (with reference to the attached drawings).

BRIEF DESCRIPTION OF THE DRAWINGS

FIG. 3 is a flowchart illustrating a procedure of processing performed by a metadata analysis unit of the image output apparatus according to the first embodiment.

FIGS. 4A, 4B and 4C are a diagram illustrating an example of an HEIF file configuration.

FIG. 5 is a diagram illustrating an example of a display image and a depth map image.

FIG. 11 is a diagram illustrating an example of an output image in a case where region annotation information is designated using a checkbox.

FIG. 12 is a diagram illustrating a functional configuration of the image output apparatus according to the second embodiment.

DESCRIPTION OF THE EMBODIMENTS

Figure 1:
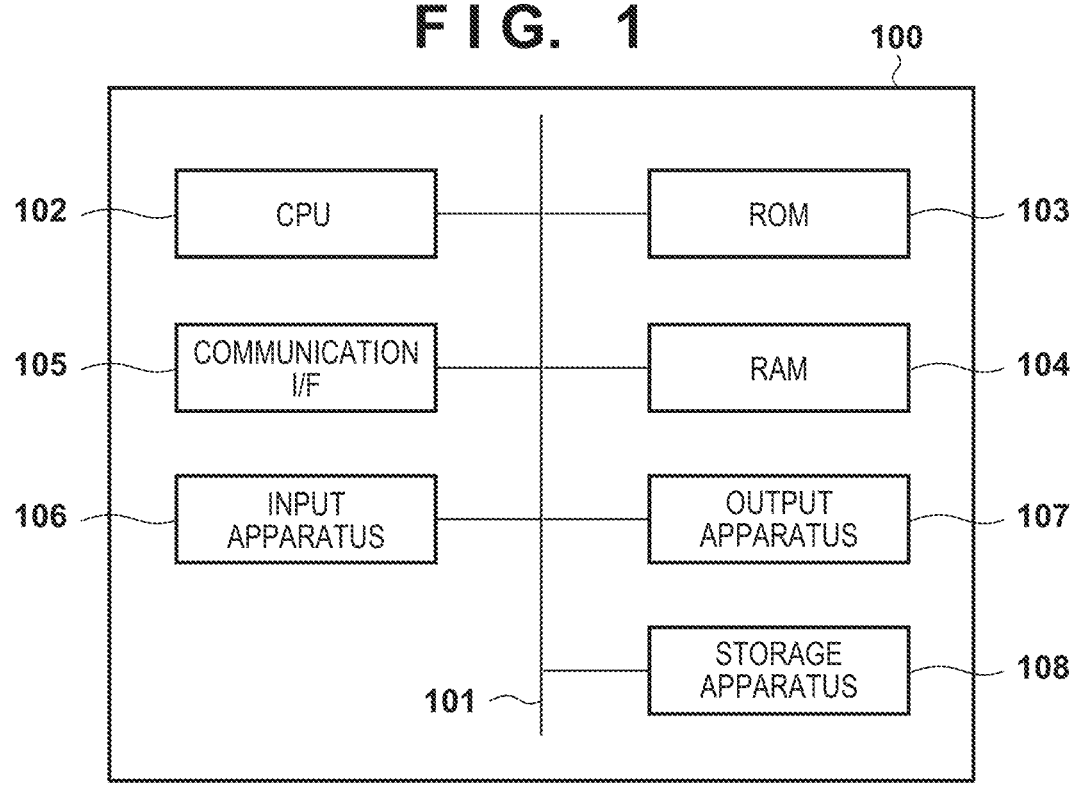
FIG. 1 is diagram illustrating a hardware configuration of an image output apparatus according to an embodiment.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

First Embodiment

In a first embodiment, an example is described in which a display image stored in an HEIF file and all the region annotation information associated with the display image are superimposed and output.
<Hardware Configuration>

FIG. 1 is a diagram illustrating an example of a hardware configuration of an image output apparatus 100 according to the present embodiment. The image output apparatus 100 is an apparatus having an image output function, such as a personal computer (PC), a smartphone, a tablet, or a printer. The present embodiment is described assuming a mode in which an image is presented to a user, using an image display application installed in a PC.

The image output apparatus 100 includes a system bus 101, a CPU 102, a ROM 103, a RAM 104, a communication interface 105, an input apparatus 106, an output apparatus 107, and a storage apparatus 108. The CPU is abbreviation for central processing unit, ROM is abbreviation for a read only memory, and RAM is abbreviation for a random access memory.

The system bus 101 connects the components to each other, and serves as a transfer path for various data. The CPU 102 performs overall control on hardware components, and controls the image output apparatus 100. The ROM 103 stores a control program and the like executed by the CPU 102. The RAM 104 temporarily stores a program and data, and functions as a main memory, a work area, or the like for the CPU 102. The communication interface 105 is an interface configured to transmit and receive communication packets over a network, and includes a wireless LAN interface, a wired LAN interface, a public mobile communication interface, and the like for example, but may be something other than these. The input apparatus 106 is an interface configured to be performed, by the user on the image output apparatus 100, selection of an image file and input of image output settings, and includes a keyboard, a mouse, a touch pad, a touch panel, a button, and the like, for example. The output apparatus 107 is a display that presents an image, or displays information input by the input apparatus 106 or processing result or the like. The input apparatus 106 and the output apparatus 107 may be integrally formed as in a case of a touch panel. The storage apparatus 108 is a storage apparatus that stores an image file and the like. Examples of this include a storage apparatus such as a hard disk drive (HDD) or a solid state drive (SSD), and an auxiliary storage apparatus using a universal serial bus (USB), a secure digital (SD), or the like. Note that the communication interface 105, the input apparatus 106, the output apparatus 107, the storage apparatus 108, and the like need not be built in the image output apparatus 100. In this case, the image output apparatus 100 performs control of outputting and displaying the processed information to separated output apparatus 107.
<Functional Configuration>

Figure 2:
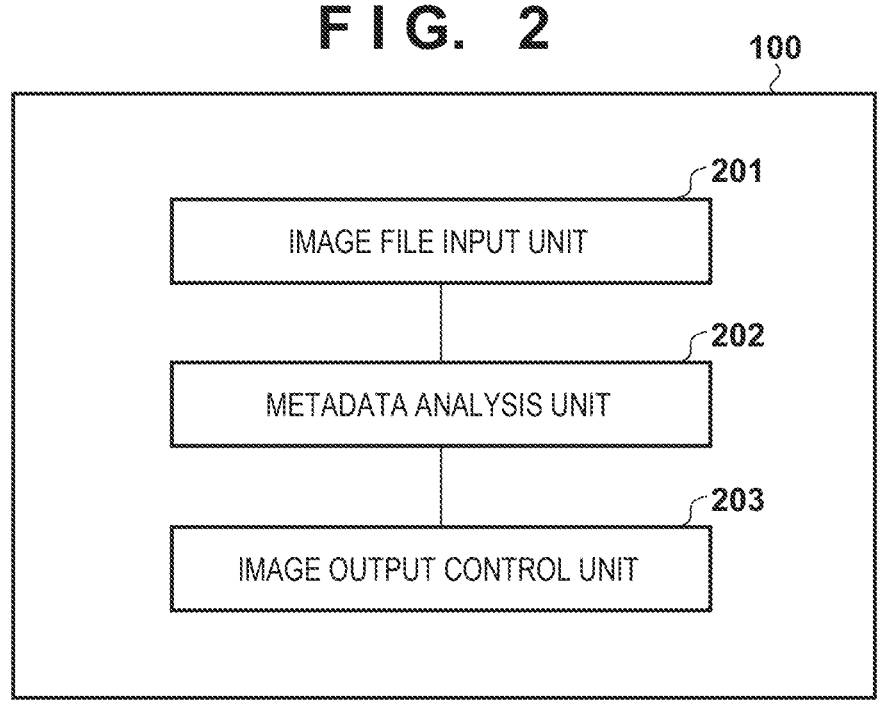
FIG. 2 is a diagram illustrating a functional configuration of the image output apparatus according to the first embodiment.

FIG. 2 is a diagram illustrating an example of a functional configuration of the image output apparatus 100 according to the present embodiment. The image output apparatus 100 includes an image file input unit 201, a metadata analysis unit 202, and an image output control unit 203.

The image file input unit 201 inputs an HEIF file storing at least one image data. The HEIF file may be input from a camera, a smartphone, or the like via the communication interface 105, or may be input from the storage apparatus 108 storing the HEIF file which is, for example, a USB flash memory, an SD card, or the like.

The metadata analysis unit 202 analyzes metadata (MetaBox) on the HEIF file input. HEIF is a storage format extended based on a tool defined by ISO Base Media File Format (ISOBMFF). Standardization of HEIF is under progress under the name of "Image File Format", in ISO/IEC 23008-12 (Part 12). The HEIF defines a normative structure including metadata, and also defines a method of associating metadata with an image and a configuration of metadata of a particular format.

The metadata analysis is processing of extracting/analyzing property information on the image data stored in the HEIF file. The property information on the image data includes first priority image information designated with PrimaryItemBox, thumbnail image information designated with Type='thmb' in ItemReferenceBox, and the like for example. The information further includes display/non-display image information indicated by Flags in ItemInfoEntryBox of ItemInfoBox, auxiliary image information, for a display image, designated with Type='auxl' in ItemReferenceBox, and the like. The auxiliary image for a display image includes an alpha channel image expressing pixel opacity and a depth map image expressing pixel depth, and the like. The metadata analysis processing required for superimposing the display image and region annotation information will be described in detail below with reference to FIG. 3.

The image output control unit 203 superimposes the display image and the region annotation information, and outputs the image to the output apparatus 107. This region annotation information according to the present embodiment includes region information expressing a region included in the display image and annotation information on the region. This region information is a rectangular region frame surrounding an object, for example, and includes, for example, a region frame 8011 in FIG. 8 described below. The annotation information is information indicating a property of the object in a region (the type of the object), and is, for example, annotation characters with which an annotation for the region is written, such as annotation information 801 in FIG. 8 described below for example. Processing of superimposing the display image and the region annotation information will be described in detail below with reference to FIG. 7.
<Analysis Processing>

Figure 4A:
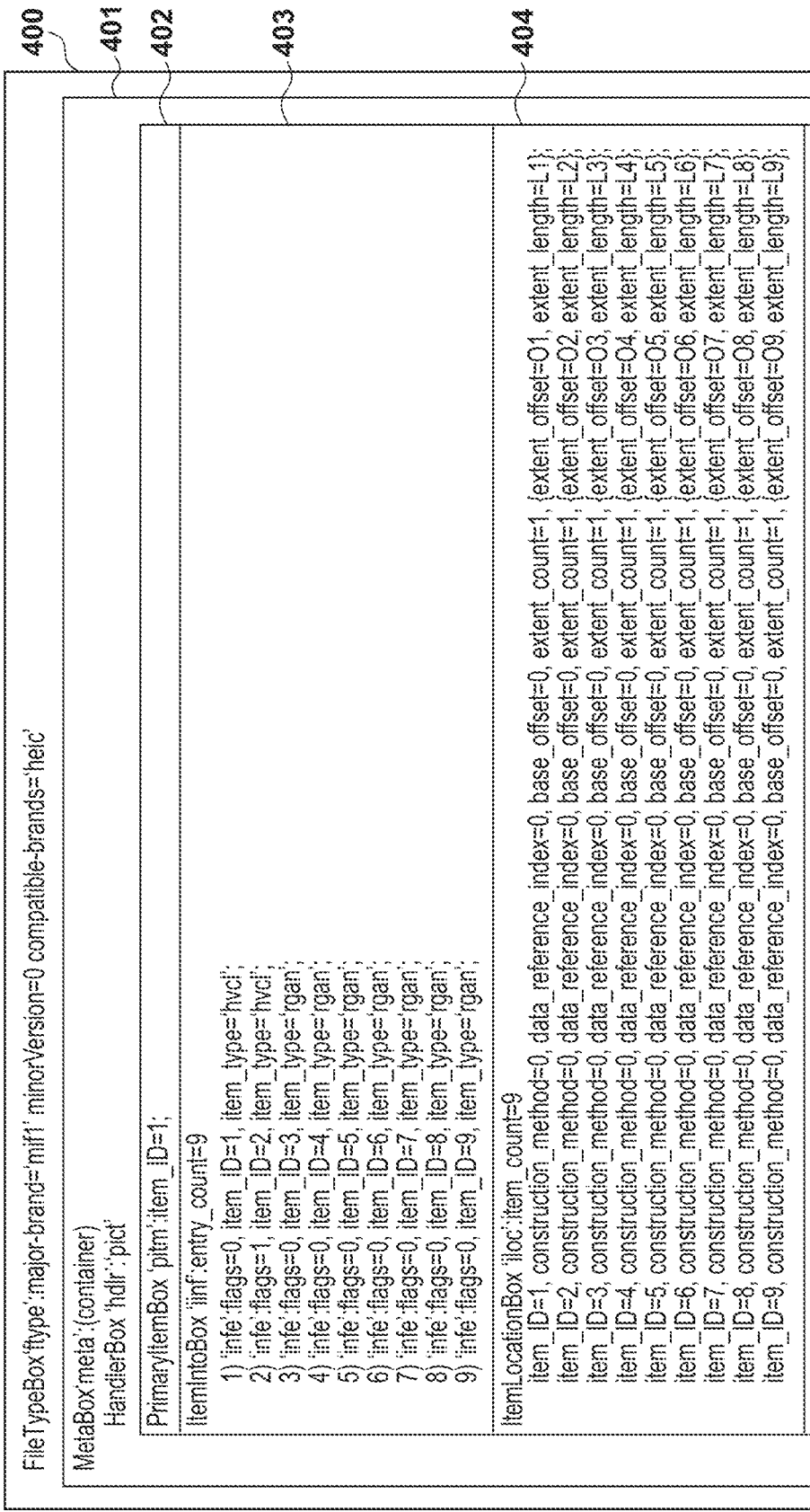

Next, a procedure of processing performed by the metadata analysis unit 202 of the image output apparatus 100 according to the present embodiment will be described with reference to a flowchart in FIG. 3. FIGS. 4A, 4B and 4C illustrate an example of metadata 401 stored in an HEIF file 400. A description will be given below with reference to a processing flow in FIG. 3 and FIGS. 4A, 4B and 4C.

In S301, the metadata analysis unit 202 analyzes PrimaryItemBox 402 and acquires a first priority image item ID '1' to be a display image. The display image does not necessarily need to be the first priority image item. Still, in the present embodiment, the first priority image item is the display image. As the display image information, an item type 'hvc1' matching the item ID '1' is acquired from InfoEntry of ItemInfoBox 403. This indicates that the image is an image item encoded with HEVC. ItemLocationBox 404 is analyzed to check a location where data of the item ID '1' is stored in MediaDataBox 409. Here, the data is stored in the HEVCImageData 410.

An item property is found from AssociationEntry matching the item ID '1', in ItemPropertyAssociation 408 of ItemPropertiesBox 406. Here, property_index '1' and '2' are acquired. These correspond to an index 1 'hvcC' and an index 2 'ispe: width=1920, height=1080' of an item property described in ItemPropertyContainerBox 407. Here, 'hvcC' indicates an HEVC encoding parameter, and 'ispe: width=1920, height=1080' indicates that the image has a size of 1920 pixels (horizontal)×1080 pixels (vertical).

In S302, the metadata analysis unit 202 checks whether there is region annotation information. The region annotation information is InfoEntry of an item type 'rgan' in ItemInfoBox 403, and here 7 items with item IDs '3' to '9' correspond to the region annotation information. The processing flow ends if there is no region annotation information.

In S303, the metadata analysis unit 202 checks whether there is a depth map image. The depth map image is ItemReference of referenceType 'auxl' in ItemReferenceBox 405, and here has a depth map image item ID as an item ID '2', as can be recognized from from_item_ID.

FIG. 5 illustrates an example of a display image and a depth map image. A depth map image 502 is an image expressing the depth with respect to a display image 501, in grayscale. Here, a region with a larger depth which is farther from the front is illustrated darker, and a region with a smaller depth which is closer to the front is illustrated brighter, but the depth may be expressed with these expression swapped.

Also for the depth map image, encoding information is acquired from InfoEntry of ItemInfoBox 403, the location of the image data in MediaDataBox 409 is acquired from ItemLocationBox 404, and the item property is acquired from ItemPropertiesBox 406, as in the case of the display image.

In the present embodiment, the processing flow ends when there is no depth map image, but a generation unit (not illustrated) may be further provided that generates a depth map image, to actively generate a depth map image. For example, when the display image is a stereoscopic image, it is a common practice to generate the image based on binocular parallax. In recent years, thanks to the AI technology, it has become possible to generate a depth map even based on a monocular image. Various known techniques can be applied for generating the depth map image.

In S304, the metadata analysis unit 202 analyzes the depth map. In the depth map analysis, a numerical value indicating the depth of each pixel of the display image is acquired. When the depth map image is encoded, the depth map image is decoded, and then information on the depth is acquired from the luminous intensity of each pixel.

In S305 and S306, the metadata analysis unit 202 determines the depth for all the region annotation information. The region annotation information is acquired from RegionItemData 411 which is a storage location in MediaDataBox 409 indicated by ItemLocationBox 404. The region annotation information includes information such as the size of the mapping image, the shape of the region, coordinates in the mapping image size, the size of the region, and the like.

The size of the mapping image does not necessarily need to match the size of the display image. When the mapping image size does not match the size of the display image, the mapping image is used for the display image after being converted to have the coordinates and the region size conforming to the ratio of the mapping image size. Here, the shape of the region is defined as geometry_type, with '1' indicating a rectangle. A shape other than the rectangle such as a circular or star shape or the like may be used. The coordinates are expressed using X and Y coordinates at the upper left of the rectangle.

Figure 6:
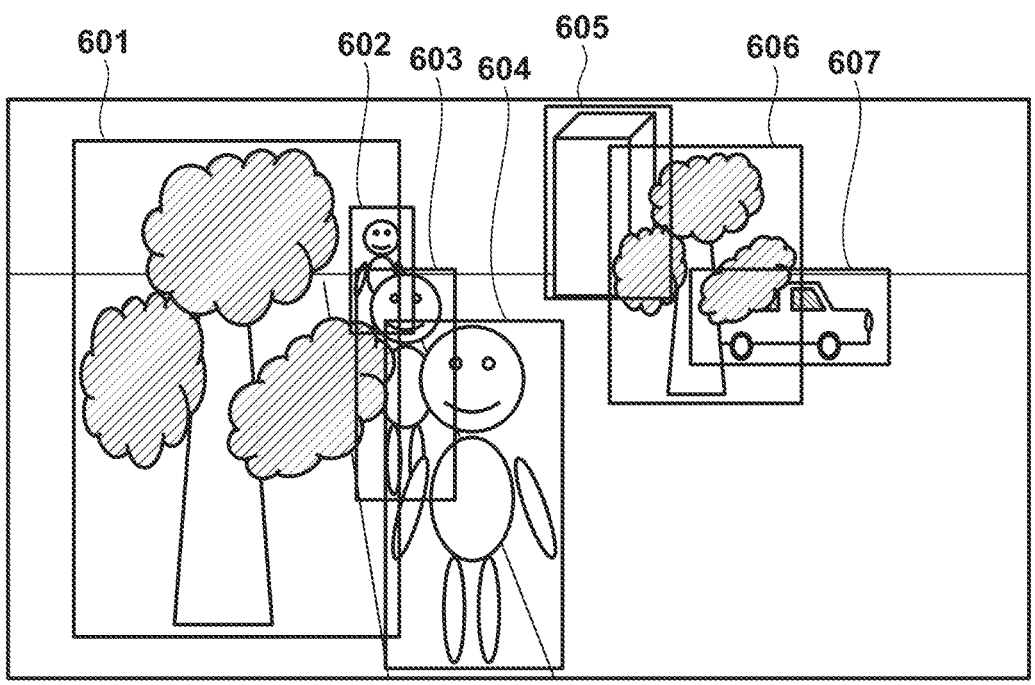
FIG. 6 is a diagram illustrating an example of a region frame superimposed diagram and a depth table.

In the upper portion of FIG. 6, an example is illustrated in which region frames are superimposed on the display image, for seven regions corresponding to region annotation information with the item IDs '3' to '9'. Numerals 601 to 607 respectively correspond to the item IDs '3' to '9'.

In S306, the metadata analysis unit 202 acquires the depths analyzed in S304 for a region portion in the displayed image extracted from the coordinates of the region annotation information and the region size, and from the depths, determines a representative depth.

An example of a method of determining the representative depth include a method including recognizing an object indicated by the region (such as tree, person, building, or car for example) through image analysis on the region portion; and obtaining the average depth for the pixel portion corresponding to the object. As an example, the lower portion of FIG. 6 illustrates a depth table 608 in which average depths of region pixels of objects are acquired and item IDs, names, and the depths corresponding to reference numerals are recorded. A smaller value of the depth indicates that the region is closer to the front, and a larger value indicates that the region is farther from the front.

In the example of FIG. 6, a reference numeral 601 has an item ID '3', name "Tree", and the depth 23. A reference numeral 602 has an item ID '4', name "Man", and the depth 198. A reference numeral 603 has an item ID '5', name "Man", and the depth 48. A reference numeral 604 has an item ID '6', name "Man", and the depth 10. A reference numeral 605 has an item ID '7', name "Building", and the depth 201. A reference numeral 606 has an item ID '8', name "Tree", and the depth 138. A reference numeral 607 has an item ID '9', name "Car", and the depth 173.

Other depth determination methods include a method using the mode, the minimum value, or the maximum value of the depth in the pixel portion of the object, and a method using the depth of the center pixel, or the like. Alternatively, the average depth, the mode, the minimum value, or the maximum value of the depth, or the depth of the center pixel may be employed for all the pixels in the region corresponding to the region annotation information, without performing the object recognition.

In other words, the depth of a region may be determined as the average value, the mode, the minimum value, or the maximum value of the depths obtained for any plurality of pixels (the pixel portion forming the object for example) in the region. Alternatively, the depth of a region may be determined as the average value, the mode, the minimum value, or the maximum value of the depths obtained for all the pixels in the region. Also, the depth of a region may be determined as the depth corresponding to the center pixel of all the pixels in the region or of any plurality of pixels (the pixel portion forming the object for example) in the region. The center pixel may be a pixel at the center of gravity.

In this manner, the metadata analysis unit 202 analyzes the depth map information using the depth map image corresponding to the display image, and determines the depth of the region included in the display image based on the depth map information.

Accordingly, a sequence of the processing of FIG. 3 ends.

<Superimposing Processing>

Figure 7:
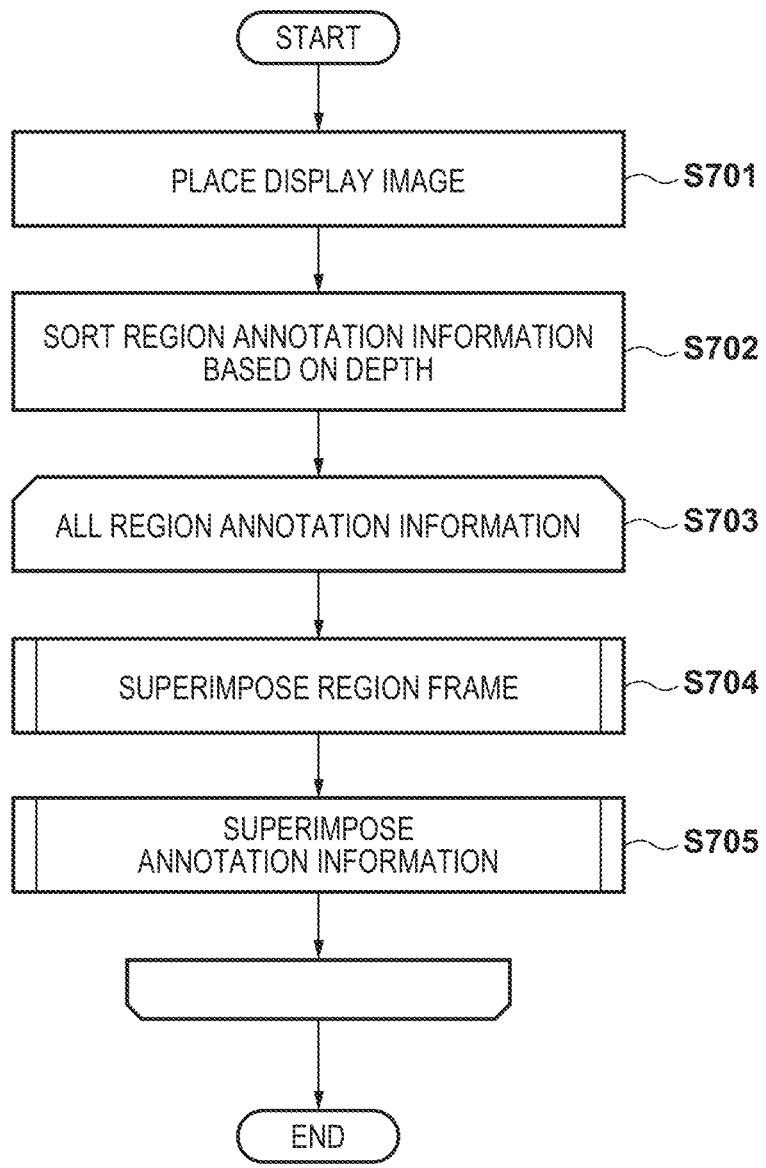
FIG. 7 is a flowchart illustrating a flow of processing of superimposing a region annotation information on a display image performed by the image output apparatus according to the first embodiment.

Next, FIG. 7 illustrates a flow of processing of superimposing region annotation information on a display image performed by the image output apparatus according to the present embodiment. In S701, the image output control unit 203 places a display image 501. In S702, the image output control unit 203 sorts the region annotation information by depth. When the depth table 608 illustrated in the lower portion of FIG. 6 is sorted in the descending order, the item IDs will be in the order of '7' (depth 201), '4' (depth 198), '9' (depth 173), '8' (depth 138), '5' (depth 48), '3' (depth 23), and '6' (depth 10) for example.

In S703 to S705, the image output control unit 203 processes all of the pieces of region annotation information in the order of sorting in S702. Here, an example is described where the sorting is performed in descending order of depth, and thus, the processing starts from the region annotation information on the farthest from the front.

Figure 8:
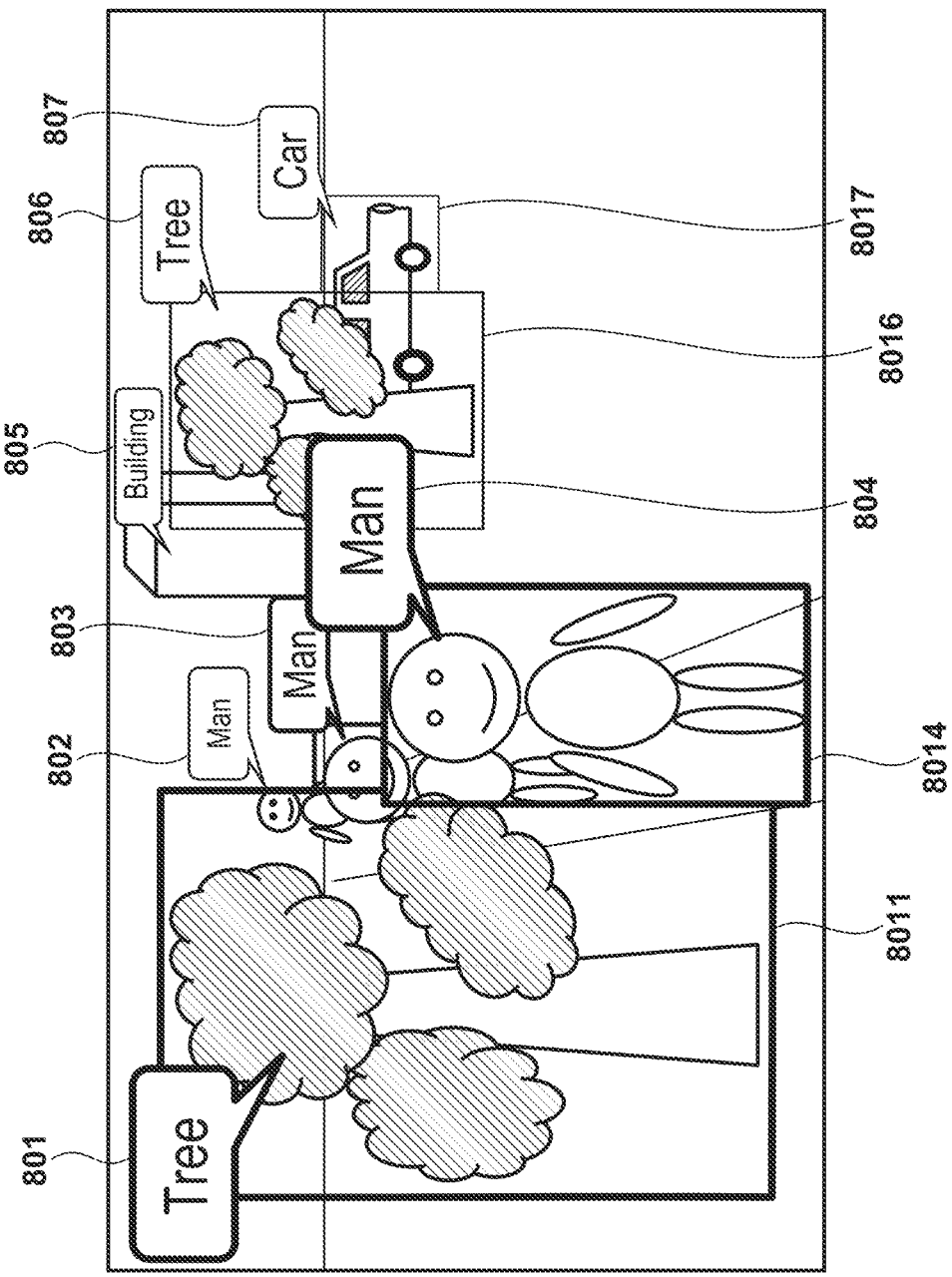
FIG. 8 is a diagram illustrating an example of an output image in which the region annotation information is superimposed on the display image.

In S704, the image output control unit 203 superimposes a frame of the region corresponding to the region annotation information (for example, when a subject in the region is a person, a frame of a rectangular region surrounding the person). In this case, when another region has already been superimposed and some part of the region to be superimposed overlaps with this other superimposed region, the frame and/or the annotation information of the other region that has already been superimposed is erased in the region to be superimposed. In the example of FIG. 8 described below, for example, the region frame 8011 is partially erased by a region frame 8014. Thus, in the display range of the region frame 8014 and/or annotation information 804 of the object in FIG. 8, a region frame 8011 and/or annotation information 803 of the object with a larger depth is not displayed. In this manner, region annotation information on a region with a larger depth (region farther from the front) is not displayed inside the display range of region annotation information on a region with a smaller depth (closer to the front).

The superimposition of the annotation information may be performed again at a non-overlapping portion. The superimposition may be performed with the thickness of the region frame changed in accordance with the depth. For example, the superimposition is performed for a region with a larger depth which is farther from the front to have a thinner region frame, and for a region with a smaller depth which is closer to the front to have a thicker region frame. Furthermore, the color of the region frame may be changed in accordance with the depth. For example, the superimposition is performed for a region with a larger depth which is farther from the front to have a region frame with a lighter color, and for a region with a smaller depth which is closer to the front to have a region frame with a darker color. With the superimposition performed with the thickness and the display density of the region frame thus varied, information on the closer to the front can be easily recognized.

In S705, the image output control unit 203 superimposes the annotation information of the region annotation information (such as, for example, an annotation character string describing the feature of the region). In FIGS. 4A, 4B and 4C, as the annotation information, the item property defined by ItemPropertyContainerBox 407 is acquired from property_index associated with the item IDs '3' to '9' in ItemPropertyAssociation 408.

Here, as the item property, the property type 'udes' defined in property_index '3' to '6' is identified as UserDescription property. Furthermore, lang stores language information, and name describes the name of the associated item in a format readable by human. In addition to these, description may be used to describe description of the item in a format readable by human. Furthermore, tags may be used to designate tag information of the associated user definition with comma delimiter.

Here, property_index '3' to '6' each have English is designated as language information, and respectively have 'Man', 'Tree', 'Building', 'Car' are defined as the item names.

FIG. 8 illustrates an example of an output image obtained by superimposing the region annotation information on the display image. On regions (601 to 607) in FIG. 6, associated annotation information 801 to annotation information 807 are respectively superimposed.

The annotation information 801 corresponding to the region 601 is a character string "Tree" displayed in a balloon format. The annotation information 802 corresponding to the region 602 is a character string "Man" displayed in a balloon format. The annotation information 803 corresponding to the region 603 is a character string "Man" displayed in a balloon format. The annotation information 804 corresponding to the region 604 is a character string "Man" displayed in a balloon format. The annotation information 805 corresponding to the region 605 is a character string "Building" displayed in a balloon format. The annotation information 806 corresponding to the region 606 is a character string "Tree" displayed in a balloon format. The annotation information 807 corresponding to the region 607 is a character string "Car" displayed in a balloon format.

Here, the item name defined with name in the item property is output as the annotation information. Alternatively, the description on the item defined by description or the tag information defined by tags may be output.

The annotation information output in a form of a balloon may be superimposed at any location in the region. Also for the annotation information, the superimposition method is changed in accordance with the depth. For example, the thickness of the balloon frame of the annotation information is changed in accordance with the depth. In FIG. 8, for example, the frames of the balloons for the annotation information 801 and 804 of regions with a small depth (positioned closer to the front) are thick frames, whereas the frames of the balloons for the annotation information 802 and 805 of regions with a large depth (positioned farther from the front) are thin frames.

Furthermore, the font size of the annotation information is set to be smaller for annotation information of a region with a larger depth which is farther from the front, and is set to be larger for annotation information of a region with a smaller depth which is closer to the front. Thus, the annotation characters for the region closer to the front is display to be larger than that for the region farther from the front.

In the example illustrated in FIG. 8, for example, the annotation information 801 and 804 for a region with a small depth (positioned closer to the front) has a large font size, the annotation information 802 and 805 for a region with a large depth (positioned farther from the front) has a small font size.

The characters may have the color changed in accordance with the depth, as in the case of the frame. For example, the annotation characters for the region closer to the front may be displayed to be in darker display density than that for the region farther from the front. Thus, the color of the characters for the annotation information for a region with a smaller depth (positioned closer to the front) may be darker, and the color of the characters for the annotation information for a region with a larger depth (positioned farther from the front) may be lighter.

Accordingly, a sequence of the processing in FIG. 7 ends.

As described above, in the present embodiment, when a single display image is output with a plurality of pieces of region annotation information associated with respective regions of the display image superimposed, the region annotation information corresponding to a region with a smaller depth is superimposed to be closer to the front than the region annotation information corresponding to a region with a larger depth.

This enables the association between a region (a rectangular region surrounding an object for example) and annotation information for the region to be easily recognized intuitively.

[Modification]

When a plurality of pieces of region annotation information are superimposed on an image, the region annotation information for a region closer to the front (a region with a smaller depth) may be displayed with higher brightness than that for a region farther from the front (a region with a larger depth). The brightness of not the entire region annotation information, and that of at least one of the rectangular frame surrounding the object and the annotation characters (annotation information) may be set to be higher for a region closer to the front (a region with a smaller depth).

Similarly, when a plurality of pieces of region annotation information are superimposed on an image, the region annotation information for a region closer to the front (a region with a smaller depth) may be displayed with higher color saturation than that for a region farther from the front (a region with a larger depth). The color saturation of not the entire region annotation information, and that of at least one of the rectangular frame (region information) surrounding the object and the annotation characters (annotation information) may be set to be higher for a region closer to the front (a region with a smaller depth).

Second Embodiment

In a second embodiment, an example is described where a display image stored in an HEIF file is output, with region annotation information, which is selected through user designation from pieces of region annotation information associated with the display image, being superimposed on the display image.

A hardware configuration of the present embodiment is the same as that in FIG. 1 used for the description in the first embodiment, and thus the description thereof will be omitted.

<Functional Configuration>

FIG. 12 is a diagram illustrating an example of a functional configuration of an image output apparatus 1200 according to the present embodiment. The image output apparatus 1200 includes the image file input unit 201, the metadata analysis unit 202, a designation unit 1201, and the image output control unit 203. The image output apparatus 1200 further includes the designation unit 1201, in addition to the configuration of the image output apparatus 100 described in the first embodiment. Note that the same components as those of the first embodiment will be denoted by the same reference numerals, and a detailed description thereof will be omitted.

The designation unit 1201 is used for designating region annotation information to be superimposed, from the region annotation information associated with the display image. The designation unit 1201 receives, based on a parameter designated by the user, the designation of the region annotation information to be output and superimposed. Examples of the parameter designated by the user include depth information, coordinate information, and an item property such as item name, tag information. An example of superimposition of region annotation information on a display image in a case of designating each parameter will be described below.

<Analysis Processing>

A flow of processing performed by the metadata analysis unit 202 in the present embodiment is the same as that in FIG. 3 used for the description in the first embodiment, and thus the description thereof will be omitted.

<Superimposing Processing>

Figure 9:
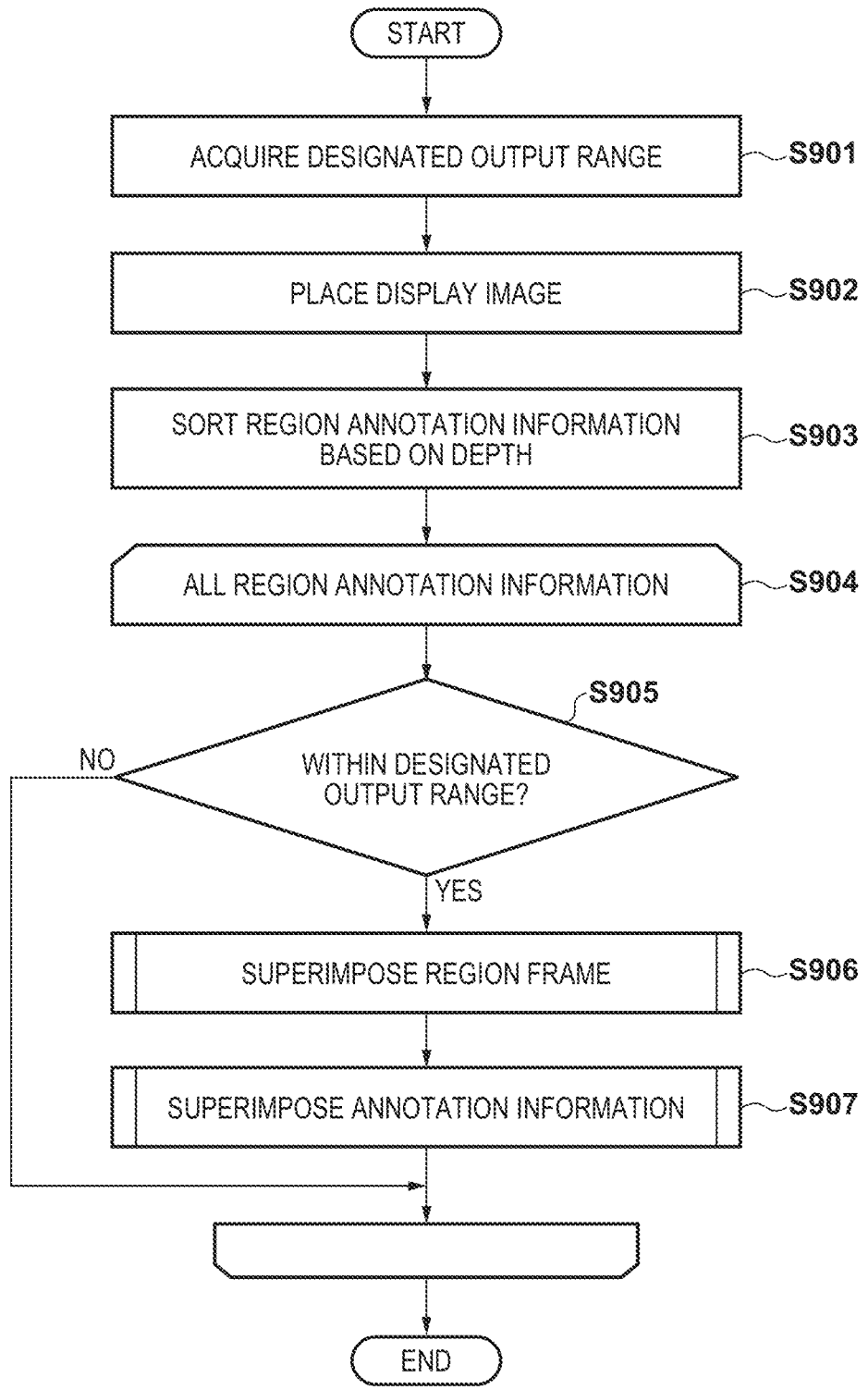
FIG. 9 is a flowchart illustrating a flow of processing of superimposing region annotation information on a display image performed by an image output apparatus according to a second embodiment.

FIG. 9 illustrates an example of a flow of processing of superimposing region annotation information on a display image performed by the image output apparatus 1200 according to the present embodiment. Here, description will be made assuming that region annotation information designated for the output is the depth and a depth range.

In S901, the designation unit 1201 acquires a depth and a depth range input by the user using the input apparatus 106 as a designated output range. The depth and depth range are designated by an input dialog, a scroll bar, or the like using an input apparatus such as a keyboard, a mouse, or a touch panel.

Note that S902, S903, and S904 are respectively the same as S701, S702, and S703, and thus the description thereof will be omitted.

In S905, the image output control unit 203 determines whether the depth of the region annotation information under processing is within the designated output range. The processing proceeds to S906 for region frame placement processing, when the depth is within the designated output range. Processing in each of S906 and S907 is the same as that in S704 and S705 respectively, and thus the description thereof will be omitted. On the other hand, when the depth is outside the designated output range, the superimposition of the region annotation information under processing is not performed and skipped. Accordingly, a sequence of the processing in FIG. 9 ends.

Figure 10:
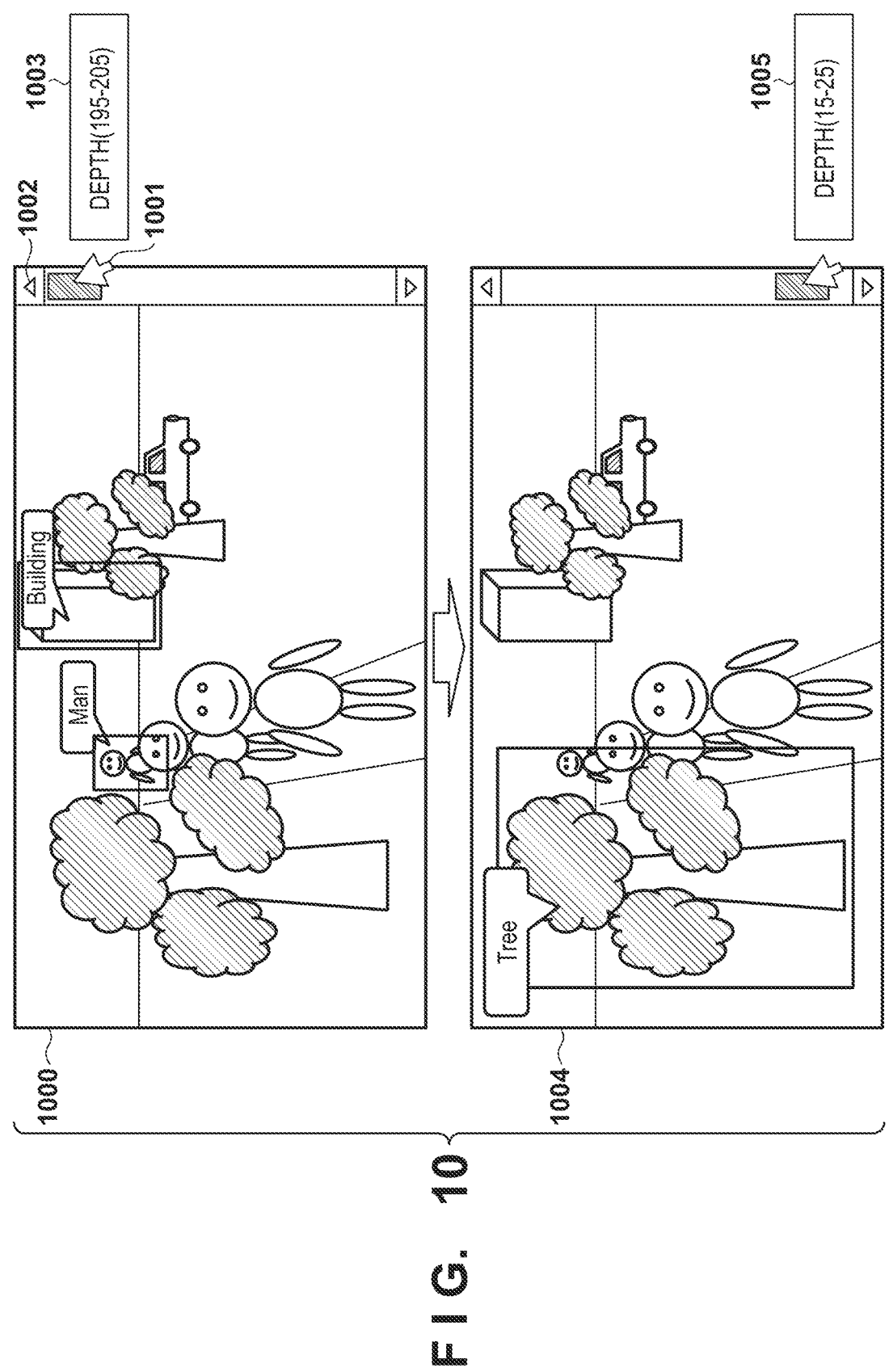
FIG. 10 is a diagram illustrating an example of an output image in a case where a depth is designated using a scroll bar.

FIG. 10 illustrates an example of an output image which is a display image having region annotation information superimposed, in a case where the user has designated the depth and the depth range using a scroll bar.

An output image 1000 is an image obtained in a case where the user operates a scroll bar 1002 using a mouse cursor 1001 to designate a depth. Here, the depth range is fixed to 10, and the depth is determined by the position of the scroll bar. An auxiliary dialog 1003 displays an output range of the depths corresponding to the current position of the scroll bar. This output range includes depths from 195 to 200. In accordance with the depth table 608 for the region annotation information illustrated in FIG. 6, pieces of region annotation information corresponding to the item ID '4' (name='Man') contained within the depth range and the item ID '7' (name='Building') are superimposed.

An output image 1004 is an image obtained in a state where the user operated the scroll bar 1002 downward from the state of the output image 1000, by using the mouse cursor 1001. An auxiliary dialog 1005 displays an output range of the depth corresponding to the current position of the scroll bar. The output range herein is a range of depths from 15 to 25, and in accordance with the depth table 608 for the region annotation information illustrated in FIG. 6, the region annotation information corresponding to the item ID '3' (name='Tree') within the depth range is superimposed.

Based on the depth designated by the user, the display image may be subjected to filter processing such as Gaussian filter for example. In that case, the region annotation information may be subjected to the same filter processing. Thus, based on the depth (and/or the depth range) designated, the region and the annotation information corresponding to the depth may be displayed after being subjected to the filter processing.

The parameter used by the user to designate the region annotation information is not limited to depth. For example, the item name of the region annotation information may be extracted, so that the user can designate the item name. FIG. 11 illustrates an example of an output image with superimposing region annotation information on a display image, when an item name of the region annotation information designated using a checkbox. The user can designate the region annotation information output by checking one or more of checkboxes 1102 to 1105 using the mouse cursor 1101. An item name of the region annotation information is written next to each checkbox. Here, a checkbox 1103 next to which 'Man' is written is checked. An output image 1100 is an example of what is displayed when the checkbox 1103 is checked. In this case, in accordance with the depth table 608 for the region annotation information illustrated in FIG. 6, pieces of region annotation information corresponding to the item IDs '4', '5', and '6' with the item name 'Man' are superimposed. Instead of the checkbox, a radio button may be used. Furthermore, the user may be able to input a character string using an input dialog for designation. Instead of the item name, a tag name (tags) may be used. Furthermore, descriptive text (description) may be searched for a character string, and when there is a hit, the corresponding region annotation information may be superimposed.

Furthermore, the user may designate coordinate information and superimpose region annotation information within a range of the coordinate information. The coordinate information may be able to be designated using a mouse, an operation such as tap on a touch panel, or the like, and may also be able to be input using an input dialog.

In the present embodiment as described above, a display image is output, with region annotation information selected through user designation, from pieces of region annotation information associated with the display image, superimposed on the display image.

For example, designation of the region annotation information to be displayed is accepted, based on designation on the depth and/or depth range, designation of coordinate information in an image, designation on a character string included in annotation characters, or a combination of these.

With this configuration, even when the number of pieces of region annotation information is large, information of a desired type can be displayed, whereby the visibility can be improved for the user.

According to the present disclosure, the association between a region in an image and annotation information for the region can be intuitively recognized.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-159721, filed Sep. 29, 2021 which is hereby incorporated by reference herein in its entirety.

What is claimed is:

1. A displaying apparatus comprising:
at least one processor which executes:
inputting a file which is compliant with ISO Base Media File Format (ISOBMFF) and includes annotation information and depth information, wherein the depth information is included in a MediaDataBox of the file, and metadata regarding the annotation information and the depth information is included in a MetaBox of the file;
acquiring the depth information from the MediaDataBox, by analyzing the metadata in the MetaBox;
determining a depth associated with the annotation information, by analyzing the depth information;
displaying the annotation information according to the determined depth,
wherein in a case where first annotation information and second annotation information are included in the file, depth information is determined for each of the first annotation information and the second annotation information, and
wherein the first annotation information associated with a first depth is displayed closer to the front than the second annotation information associated with a second depth that has larger depth than the first depth.

2. The displaying apparatus according to claim 1, the depth information is depth map information using a depth map image corresponding to an image, and determine a depth of a region included in the image based on the depth map information.

3. The displaying apparatus according to claim 2, the at least one processor generates the depth map image from the image, wherein
the at least one processor analyzes depth map information by using the generated depth map image.

4. The displaying apparatus according to claim 3, wherein the at least one processor determines, as each of the first depth and the second depth, an average value, a mode, a minimum value, or a maximum value of depths with respect to any plurality of pixels in each of the first region and the second region.

5. The displaying apparatus according to claim 4, wherein the any plurality of pixels are all pixels in each of the first region and the second region.

6. The displaying apparatus according to claim 1, wherein in a case where the first annotation information and the second annotation information are displayed, the at least one processor does not display the second annotation information within a display range of the first annotation information.

7. The displaying apparatus according to claim 1, wherein
the at least one processor displays the first annotation information with a display density higher than a display density for the second annotation information.

8. The displaying apparatus according to claim 1, wherein
the annotation information is displayed with a region frame surrounding a region, and
when the at least one processor displays a first region frame for the first annotation information and a second region frame for the second annotation information, with the first region frame being thicker than the second region frame.

9. The displaying apparatus according to claim 1, wherein
the annotation information is annotation characters with which annotation for a region is written, and
the at least one processor displays first annotation characters of the first annotation information and second annotation characters of the second annotation information, with the first annotation characters being larger than the second annotation characters.

10. The displaying apparatus according to claim 1, wherein
the annotation information is annotation characters with which annotation for a region is written, and
the at least one processor displays first annotation characters of the first annotation information and second annotation characters of the second annotation information, with a display density of the first annotation characters being higher than a display density of the second annotation characters.

11. The displaying apparatus according to claim 1, wherein the at least one processor displays the first annotation information and the second annotation information, with brightness of the first annotation information being higher than brightness of the second annotation information.

12. The displaying apparatus according to claim 1, wherein the at least one processor displays the first annotation information and the second annotation information, with the first annotation information having higher color saturation than the second annotation information.

13. The displaying apparatus according to claim 1, the at least one processor accepts designation of annotation information, wherein
the at least one processor displays the designated annotation information.

14. The displaying apparatus according to claim 13, wherein the at least one processor accepts designation of annotation information to be displayed, based on designation of a depth and a depth range.

15. The displaying apparatus according to claim 13, wherein the at least one processor accepts designation of annotation information to be displayed, based on designation of coordinate information.

16. The displaying apparatus according to claim 13, wherein
the annotation information is annotation characters with which annotation for a region is written, and
the at least one processor accepts designation of annotation information to be displayed, based on designation of a character string included in the annotation characters.

17. The displaying apparatus according to claim 1, wherein the file includes region information regarding a region in an image, in the MetaBox, and
wherein the at least one processor determines a depth corresponding to the region associated with annotation information, and
wherein in a case where the file includes first region information regarding a first region corresponding to the first annotation information and second region information regarding a second region corresponding to the second annotation information, the at least one processor displays the first annotation information on the first region in the image and the second annotation information on the second region in the image.

18. The displaying apparatus according to claim 1, wherein the at least one processor determines whether the file includes the depth information, by analyzing the metadata.

19. A method for controlling a displaying apparatus, the method comprising:
inputting a file which is compliant with ISO Base Media File Format (ISOBMFF) and includes annotation information and depth information, wherein the depth information is included in a MediaDataBox of the file, and metadata regarding the annotation information and the depth information is included in a MetaBox of the file;
acquiring the depth information from the MediaDataBox, by analyzing the metadata in the MetaBox;
determining a depth associated with the annotation information, by analyzing the depth information;
displaying the annotation information according to the determined depth,
wherein in a case where first annotation information and second annotation information are included in the file, depth information is determined for each of the first annotation information and the second annotation information, and
wherein the first annotation information associated with a first depth is displayed closer to the front than the second annotation information associated with a second depth that has larger depth than the first depth.

20. A non-transitory computer-readable storage medium storing a program for causing a computer to execute a method for controlling an image output apparatus, the method comprising:
inputting a file which is compliant with ISO Base Media File Format (ISOBMFF) and includes annotation information and depth information, wherein the depth information is included in a MediaDataBox of the file, and metadata regarding the annotation information and the depth information is included in a MetaBox of the file;
acquiring the depth information from the MediaDataBox, by analyzing the metadata in the MetaBox;

determining a depth associated with the annotation information, by analyzing the depth information;
displaying the annotation information according to the determined depth,
wherein in a case where first annotation information and second annotation information are included in the file, depth information is determined for each of the first annotation information and the second annotation information, and
wherein the first annotation information associated with a first depth is displayed closer to the front than the second annotation information associated with a second depth that has larger depth than the first depth.

\* \* \* \* \*